June 1, 1965   J. B. MURTLAND, JR., ETAL   3,187,077
CONTROL SYSTEM FOR CONSUMABLE ELECTRODE FURNACE
Filed June 18, 1963
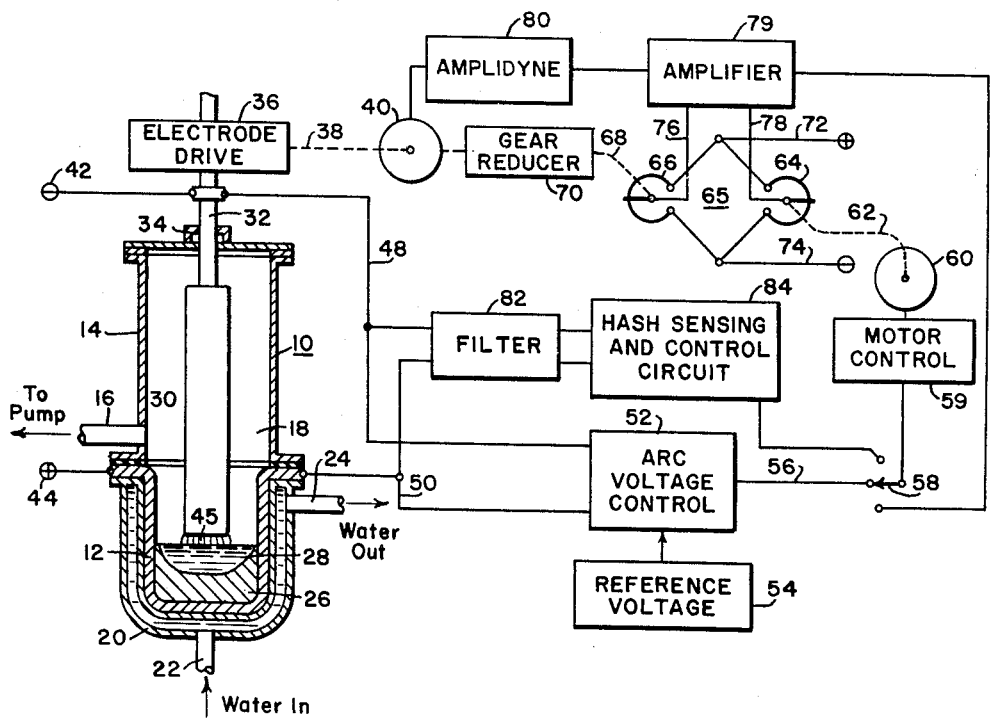
INVENTORS
James B. Murtland, Jr., Charles F. Rebhun
and Harold S. Jackson.
BY
ATTORNEY United States Patent Office 3,187,077
Patented June 1, 1965

3,187,077
CONTROL SYSTEM FOR CONSUMABLE ELECTRODE FURNACE
James B. Murtland, Jr., and Charles F. Rebhun, Natrona Heights, Pa., and Harold S. Jackson, Troy, N.Y., assignors to Allegheny Ludlum Steel Corporation, Brackenridge, Pa., a corporation of Pennsylvania
Filed June 18, 1963, Ser. No. 288,644
9 Claims. (Cl. 13—13)

This invention relates to a control system for a consumable electrode furnace, and more particularly to an adjustable speed position regulator for a consumable electrode furnace.

As is known, consumable arc melting furnaces usually comprise an electrode of the metal to be melted extending downwardly into a mold or crucible which receives the molten metal and within which an ingot is formed. The electrode is connected to one terminal of a direct current voltage source, and means are provided for electrically connecting the other terminal of the source to the mold and, hence, to the molten metal. Usually, in starting the melt, a small supply of chips or the like is placed in the mold so that when the arc is struck the chips are melted to form an initial molten metal supply in the crucible mold. After the arc is initially struck, the arc is maintained between the electrode to be melted and the molten pool of metal beneath it, the electrode being melted due to the heat of the arc. As the electrode is melted, it is deposited in and forms the aforesaid molten pool, the bottom portion of which continuously solidifies as the electrode melts to form an ingot which increases in length, starting from the bottom upwardly. In this process, impurities float to and on the top of the molten pool; and assuming that the pool does not solidify during the formation of the ingot, the major portion of the impurities will be excluded from the main body of the ingot.

In any consumable electrode furnace it is desirable to provide a constant and uniform melt rate to produce ingots of good quality. A constant melt rate, in turn, necessitates a fine control of the position of the electrode relative to the molten pool beneath it to maintain a more or less fixed arc gap. In most cases, electrical motors are employed to effect electrode movement; however the acceleration of a relatively large mass of varying weight by such motors presents problems. In certain cases, it is necessary to accelerate the rotors of the motors from standstill in a short period of time whereby the electrode is also made to move. In other cases, two continuously-running motors are employed, the difference in speed between them causing the electrode to be moved. In this latter case, it is only necessary to increase or reduce to some extent the speed of one or both motors in order to have only relatively small accelerations, but coupling of the two motors and the transmission of the difference in speed to the electrode represents a difficult problem. Mechanical differential arrangements driven by electrical motors have also been used; however these still present the same problem of accelerating a large mass of varying weight to maintain a fixed arc gap.

The electrical motors used to effect electrode movement are controlled as a function of an electrical characteristic of the arc which spans the distance between the bottom of the electrode and the molten pool beneath it. This characteristic is indicative of the arc length and may, for example, comprise arc gap voltage or recurring voltage discontinuities ("hash") of characteristic frequency superimposed on the direct current arc voltage. The hash effect and its application to control systems may be understood by reference to our copending application Serial No. 405,646, filed October 8, 1964, and assigned to the assignee of the present application which application is a continuation of application Serial No. 270,087, filed April 2, 1963 and now abandoned.

In prior art systems, an electrical signal proportional to arc voltage was applied to the drive motors as a control signal in a servo loop arrangement in an effort to maintain the arc gap constant, or at least approximately constant. The difficulty with this procedure, however, is the problem mentioned above of accelerating a large mass of varying weight. That is, the electrical control signal proportional to a characteristic of the arc is the same for a given arc length, or change in arc length, at the beginning and end of the melting procedure. However, the weight of the electrode and its inertia decrease as it is melted. Consequently, the same control signal at the beginning of a melt may effect a different physical movement of the electrode at the beginning of the melt than at its completion due to the difference in weight of the electrode and consequent difference in inertia, frictional resistance of gears or other moving parts of the drive system and the like.

As an overall object, the present invention provides a system which overcomes the aforementioned and other disadvantages of prior art control systems for consumable electrode furnaces.

More specifically, an object of the invention is to provide a control system for a consumable electrode furnace wherein an electrical signal proportional to the physical position of the electrode with respect to a fixed point on the furnace is compared with a second signal which is proportional to the desired position of the electrode. The difference signal obtained by comparison of the aforesaid voltages is then used to control the drive motor for effecting movement of the electrode; and since this difference signal reflects the actual deviation in position of the electrode from a desired position and not merely an electrical characteristic of the arc, the electrical drive motors will be caused to move the electrode in the correct amount regardless of factors such as varying weight and inertia of the electrode, frictional resistance of gears and the like.

In accordance with the invention, we provide first means for producing an electrical signal which varies in magnitude as the electrode moves downwardly toward the molten pool of metal beneath it, second means for producing an electrical signal which varies in magnitude as a function of the desired position of the electrode being melted, means for electrically comparing the first and second signals to produce a difference signal, and circuit means for applying the difference signal to an electrically-controlled motor device to cause that motor device to move the electrode downwardly. Preferably, the first and second means mentioned above comprise a pair of potentiometer devices in a bridge circuit configuration and arranged such that movement of a movable tap on one potentiometer device without corresponding movement of a tap on the other potentiometer device will unbalance the bridge to produce an output signal. The tap on one of the potentiometer devices is connected to the electrode such that the tap will move in an amount proportional to movement of the electrode downwardly toward the molten pool. The signal produced between this tap and a reference point in the bridge comprises the first signal mentioned above which varies in magnitude as the electrode moves downwardly. The tap on the other potentiometer device is connected to a servomotor which rotates in response to a signal which increases in magnitude as a function of the deviation of the arc gap from a desired value, the speed and duration of rotation of the servomotor being proportional to the magnitude and duration of its control signal. In this manner, the amount of movement of the tap on the other potentiometer device increases as the electrode is melted; and the signal produced between that tap and a reference point in the bridge comprises the second electrical signal mentioned above which varies as a function of the amount of the electrode which is melted. The output signal from the bridge circuit arrangement, which comprises the aforesaid difference signal obtained by comparison of the first and second signals, is then applied to the drive motor for the electrode in the manner described above.

The above and other objects and features of the invention will become apparent from the following detailed description taken in connection with the accompanying single figure drawing which forms a part of this specification.

Referring now to the drawing, a consumable electrode arc furnace is schematically illustrated and identified by the reference numeral 10. The furnace comprises a conductive mold or crucible 12 which may, for example, be fabricated of copper. Covering the upper open end of the mold 12 is a gas-tight housing 14 having a connection at 16 to means, not shown, for evacuating the chamber 18 formed by the mold 12 and the housing 14 covering it. Alternatively, the chamber 18 could be filled with an inert gas; however in either case the metal to be melted is protected from oxidation. Surrounding the mold 12 is a water jacket 20 having inlet and outlet ports 22 and 24 connected thereto.

The mold 12 contains the ingot 26 which is formed from a molten pool 28 adjacent the lower end of an electrode 30 of the metal to be melted. Electrode 30 extends upwardly from the mold 12 and is connected at its upper end to a reciprocable rod or electrode ram carrier 32 which extends through a seal in the housing 14. The ram 32 is connected to a suitable drive which may be mechanical or hydraulic; however in either case the drive is controlled by an electrical signal as will hereinafter be explained. In this particular embodiment, the electrode drive 36 comprises a rack and pinion, chain, or worm and screw arrangement connected throught shaft 38 to a drive motor 40, the arrangement being such that as the motor 40 is rotated in one direction, the ram 32 and electrode 30 carried thereby will move upwardly; whereas rotation of the motor 40 in the opposite direction will cause downward movement of the electrode 30. During a melting operation, and in accordance with the invention, the ram 32 and electrode 30 move downwardly only, the upward movement of the ram being used only to reposition it preparatory to a succeeding melting operation. Connected to the ram 32 and, hence, to the electrode 30 is the negative terminal 42 of a direct current voltage source, not shown. Positive terminal 44 of this same voltage source is connected to the mold 12, the arrangement being such that an arc 45 will be struck between the lower end of the electrode 30 and the bottom of the mold 12, thereby forming heat which progressively melts the end of the electrode and causes the formation of the aforesaid molten pool 28. As the electrode 30 is melted it is, of course, necessary to move it downwardly by means of the motor 40 and electrode drive 36 in order to maintain the desired arc gap.

As was mentioned above, it has been the practice in the past to attempt to control the position of the electrode 30 to maintain the desired arc gap and a constant and uniform melt rate by controlling the motor 40 as a function of an electrical characteristic of the arc. One such characteristic which has been used heretofore is the voltage across the arc. Another characteristic, more fully described below, is the occurrence of voltage discontinuities in the form of positive-going pulses which are superimposed on the base arc gap voltage, each of which persists for a short time such as 40 milliseconds at a frequency below about 30 cycles per second. This characteristic, known as "hash" can be used, like arc gap voltage, for the purpose of controlling the motor 40 and, hence, the downward movement of the electrode 30.

The difficulty with attempting to control the position of the electrode as a function of a characteristic of the arc alone is that the same control signal is employed to drive the motor 40 at the start of a melt for a desired movement as is used for the same desired movement at the end of the melt when the mass and inertia of the electrode are materially reduced. That is, at the start of the melt, much of the torque developed by the motor 40 will be utilized in overcoming frictional and inertial forces which are materially reduced at the end of the melt; and since the signal does not take these forces into account, a constant and uniform movement of the electrode 30 is not achieved.

As was explained above, the characteristic of the arc gap used to control the electrode 30 may be either arc voltage or "hash." Arc voltage control will be considered first. The arc voltage is applied through leads 48 and 50 to an arc voltage control circuit 52 where it is compared with a reference voltage from source 54. The difference voltage from circuit 52 may then be applied through lead 56 and switch 58 to a control circuit 59 for a servomotor 60, the servomotor being mechanically connected through linkage 62 to the movable tap on a first potentiometer 64. The potentiometer 64 is included in a bridge circuit arrangement 65 which includes a second potentiometer 66 having its movable tap connected through mechanical linkage 68 and a gear reducer 70 to the drive motor 40, the arrangement being such that as the electrode 30 is moved downwardly by the motor 40, the tap on potentiometer 66 will be caused to advance in an amount proportional to the downward movement of the electrode. The bridge circuit 65 comprising the potentiometers 64 and 66 is energized from a source of voltage, not shown, through input terminals 72 and 74; while output signals from the bridge circuit configuration are applied through leads 76 and 78 and amplifier 79 to an Amplidyne (trademark) circuit 80 which, as will be understood, controls the motor 40.

It will be assumed that the movable tap on potentiometer 64 rotates in a clockwise direction while the tap on potentiometer 66 rotates in a counterclockwise direction. At the start of a melting operation with the ram 32 in its uppermost position, the tap on potentiometer 66 will be, for example, at its top dead-center position. Similarly, the tap on potentiometer 64 will be adjusted manually or otherwise such that it is also at top dead-center position. Consequently, under these circumstances, no output signal is applied to the Amplidyne control circuit 80 through leads 76 and 78 and amplifier 79.

In order to initiate the melting operation, switch 58 is moved to its lowermost position illustrated in the drawing such that motor control circuit 59 for servomotor 60 is connected to amplifier 79. In this manner, the servomotor will be directly responsive to any unbalance in the bridge and will act to bring it back into balance. Therefore, at the instant of strike arc, the bridge will be balanced. Immediately, thereafter, switch 58 connects circuit 59 to either circuit 52 or circuit 84, depending upon whether hash control or arc voltage control is desired.

When the arc is struck between the electrode 30 and the bottom of the mold 12, the electrode will begin to melt, and as it melts the arc voltage will increase to the point where it exceeds the reference voltage 54. This produces a signal on lead 56 which, assuming that switch 58 is in its center position, rotates the servomotor 60. When servomotor 60 rotates, the tap on potentiometer 64 will be caused to rotate in a clockwise direction, thereby unbalancing the bridge circuit configuration 65 and producing an output signal on leads 76 and 78 to actuate drive motor 40 to move the electrode 30 downwardly. This causes the arc voltage to decrease and at the same time rotates the tap on potentiometer 66 in a counterclockwise direction to again balance the bridge. When the arc voltage again increases due to continued melting of the electrode, the servomotor 60 will again rotate to move the tap on potentiometer 64 further in a clockwise direction. As will be appreciated, the motor 40 will follow this action to move the electrode 30 downwardly with the tap on potentiometer 66 following that on potentiometer 64 to maintain the bridge balanced.

Thus, as the electrode continues to melt, the motor 40 is caused to move it downwardly continually with the downward movement being controlled by the actual physical position of the electrode 30 in combination with arc voltage rather than the arc voltage alone as in prior art systems. Therefore, regardless of the difference in inertial and frictional forces at the beginning and end of a melting operation, the motor 40 will be caused to move the electrode 30 downwardly in a proper amount by virtue of the action of the potentiometer 66.

Considering, now, the case where "hash" control is employed, the arc voltage is again sensed; however it is passed through a filter 82 to eliminate the ripple content in the direct current voltage applied to the terminals 42 and 44. As is known, a direct current, other than that derived from a battery or other chemical source, is not absolutely unvarying in its magnitude, but will contain a small ripple which is due either to the rectifiers employed in rectifying an alternating current voltage or due to the action of a commutator in a direct current generator. The direct current voltage is, therefore, passed through the filter 82 which eliminates the ripple content therein. In one specific application, the filter 82 is such as to pass only those recurring voltage fluctuations having a frequency beneath about 30 cycles per second. The specific value of 30 cycles per second, however, is not to be considered as limiting, the only requirement being that the filter eliminate the ripple voltage. It would, of course, be expected that after passing through the filter 82 which eliminates the ripple content of the direct current voltage, a more or less unvarying steady-state direct current voltage would be obtained. Contrary to expectations, however, the output of the filter 82 comprises positive-going voltage discontinuities superimposed on the base direct current voltage. These voltage discontinuities characteristically occur in bunches, each discontinuity persisting for about 40 to 100 milliseconds, and comprises the "hash" discussed above. The exact reason for the occurrence of the voltage discontinuities or hash is unknown; however the fact is that they do occur and can be used for controlling the position of the electrode 30.

The output of the filter 82 comprising the voltage discontinuities is applied to a hash sensing and control circuit 84, the details of which can best be understood by reference to the aforesaid copending application Serial No. 405,646. The output of the hash control circuit 84, like that on lead 56, comprises a control signal which appears as the electrode 30 is melted, the magnitude of the signal being a function of the melt rate. Therefore, by positioning the switch 58 such that the servomotor 60 is connected to circuit 84 rather than circuit 52, the hash can be used in the same manner as arc voltage for the purpose of positioning the movable tap on potentiometer 64 and for controlling the motor 40.

Although the invention has been shown in connection with a certain specific embodiment, it will be readily apparent to those skilled in the art that various changes in form and arrangement of parts may be made to suit requirements without departing from the spirit and scope of the invention. In this respect, it will be apparent that a hydraulic drive could be used for the electrode 30 in accordance with the principles of the invention instead of an electrical drive motor. In this latter case, the output of the bridge circuit 65 would be used to adjust the control valves for the hydraulic drive with the same overall effect. That is, in either case the drive is electrically controlled in response to the output of the bridge.

We claim as our invention:

1. In a consumable electrode furnace of the type in which an arc is struck between a consumable electrode and a molten pool of metal beneath it and in which an electrically-controlled drive device is employed to move the electrode downwardly toward the molten pool as it is consumed; the improvement comprising first means for producing a first electrical signal which increases in magnitude as the electrode moves downwardly toward said molten pool, second means for producing a second electrical signal which increases in magnitude as the electrode is consumed by melting, said first and second signals being of equal magnitude when the electrode is properly positioned with respect to the molten pool, means for electrically comparing said first and second signals to produce a difference signal, and circuit means for controlling said electrically-controlled drive device as a function of said difference signal to cause the drive device to move the electrode downwardly.

2. In a consumable electrode furnace of the type in which an arc is struck between a consumable electrode and a molten pool of metal beneath it and in which an electrically-controlled motor device is employed to move the electrode downwardly toward the molten pool as it is consumed; the improvement comprising first means for producing a first electrical signal which varies in magnitude as the top of the electrode moves downwardly toward the molten pool, means for detecting recurring fluctuations in an electrical characteristic of said arc which recur within a predetermined frequency range, means coupled to said detecting means for producing a second electrical signal which varies in magnitude as a function of the number of said recurring fluctuations, said first and second signals being of equal magnitude when the electrode is properly positioned with respect of the molten pool, means for electrically comparing said first and second signals to produce a difference signal, and circuit means responsive to said difference signal for controlling said motor device to move the electrode downwardly.

3. In a consumable electrode furnace of the type in which an arc is struck between a consumable electrode and a molten pool of metal beneath it and in which an electrically-controlled motor device is employed to move the electrode downwardly toward the molten pool as it is consumed; the improvement comprising first means for producing a first electrical signal which varies in magnitude as the electrode moves downwardly toward the molten pool, means for filtering the voltage across said arc to eliminate all recurring voltage fluctuations therein other than those recurring beneath a predetermined frequency, means coupled to said filtering means for producing a second electrical signal which varies in response to variations in the voltage fluctuations which recur beneath said predetermined frequency, apparatus responsive to the output of said last-named means for producing a third electrical signal which varies in magnitude as a function of the number of said voltage fluctuations, said first and third signals being of equal magnitude when the electrode is properly positioned with respect to the molten pool, means for electrically comparing said first and third signals to produce a difference signal, and apparaus responsive to said difference signal for causing said motor device to move the electrode downwardly.

4. In a consumable electrode furnace of the type in which an arc is struck between a consumable electrode and a molten pool of metal beneath it and in which an electrically-controlled drive device is employed to move the electrode downwardly toward the molten pool as it is consumed; the improvement comprising first means for producing a first electrical signal which increases in magnitude as the electrode moves downwardly toward the molten pool, means for producing a second electrical signal which increases in magnitude as a function of the magnitude of the voltage across said arc, said first and second signals being of equal magnitude when the electrode is properly positioned with respect to the molten pool, means for electrically comparing said first and second signals to produce a difference signal, and circuit means responsive to said difference signal for actuating said drive device to move the electrode downwardly.

5. In a consumable electrode furnace of the type in which an arc is struck between a consumable electrode and a molten pool of metal beneath it and in which an electrically-controlled motor device is employed to move the electrode downwardly toward the molten pool as it is consumed; the improvement comprising bridge circuit means including first and second potentiometer devices each having a movable tap thereon and arranged such that movement of the tap on one potentiometer device without corresponding movement of the tap on the other potentiometer device will unbalance the bridge to produce an output signal, means operatively connecting the tap on one of said potentiometer devices to said electrode such that the tap will move in an amount proportional to movement of the electrode downwardly toward said molten pool, means for producing an electrical signal which increases in magnitude as a function of the amount of the electrode which is melted, servomotor means responsive to said electrical signal for driving the movable tap on the other of said potentiometer devices, and circuit means for applying said output signal from the bridge circuit means to said motor device to cause the electrode to move downwardly.

6. In a consumable electrode furnace of the type in which an arc is struck between a consumable electrode and a molten pool of metal beneath it and in which an electrically-controlled motor device is employed to move the electrode downwardly toward the molten pool as it is consumed; the improvement comprising bridge circuit means including first and second potentiometer devices each having a movable tap thereon and arranged such that movement of the one tap without corresponding movement of the other will unbalance the bridge circuit means to produce an output signal, means operatively connecting the movable tap on one of said potentiometer devices to said electrode whereby that tap will be caused to move in an amount proportional to movement of the electrode downwardly toward said molten pool, servomotor means connected to the tap on the other of said potentiometer devices, means for producing an electrical signal which varies as a function of the voltage across said arc, circuit means for applying said electrical signal to the servomotor means whereby the tap on the other potentiometer device will be caused to move in a direction to counteract unbalance of the bridge circuit means caused by movement of the tap on said one potentiometer device, and circuit means for applying said output signal from the bridge circuit means to said electrically-controlled motor device to cause the electrode to move downwardly toward said molten pool.

7. In a consumable electrode furnace of the type in which an arc is struck between a consumable electrode and a molten pool of metal beneath it and in which an electrically-controlled motor device is employed to move the electrode downwardly toward the molten pool as it is consumed; the improvement comprising bridge circuit means including potentiometer devices each having a movable tap thereon and arranged such that movement of the one tap without corresponding movement of the other will unbalance the bridge circuit means to produce an output signal, means operatively connecting the movable tap on one of said potentiometer devices to said electrode whereby that tap will be caused to move in an amount proportional to movement of the electrode downwardly toward said molten pool, servomotor means connected to the tap on the other of said potentiometer devices, means for producing an electrical signal which varies as a function of an electrical characteristic of said arc, circuit means for applying said electrical signal to the servomotor means to drive the servomotor means in one direction whereby the tap on the other potentiometer device will be caused to move in a direction to counteract unbalance of the bridge circuit means caused by movement of the tap on said one potentiometer device, the servomotor means serving to advance the tap on said other potentiometer device continuously in one direction as the electrode is melted, and means for applying an output signal from said bridge circuit means to said electrically-controlled motor device to cause said electrode to move downwardly toward said molten pool.

8. In a consumable electrode furnace of the type in which an arc is struck between a consumable electrode and a molten pool of metal beneath it and in which an electrically-controlled motor device is employed to move the electrode downwardly toward the molten pool as it is consumed; the improvement comprising bridge circuit means including first and second potentiometer devices each having a movable tap thereon and arranged such that movement of the one tap without corresponding movement of the other will unbalance the bridge circuit means to produce an output signal, means operatively connecting the movable tap on one of said potentiometer devices to said electrode whereby that tap will be caused to move in an amount proportional to movement of the electrode downwardly toward said molten pool, servomotor means connected to the tap on the other of said potentiometer devices, means for filtering the voltage across said arc to eliminate all recurring voltage fluctuations therein other than those recurring beneath a predetermined frequency, means coupled to said filtering means for producing an electrical signal which varies in response to variations in the volatge fluctuations which recur beneath said predetermined frequency, circuit means for applying said electrical signal to the servomotor means whereby the tap on the other potentiometer device will be caused to move continuously in one direction to counteract unbalance of the bridge circuit means caused by movement of the tap on said one potentiometer device, and means for applying an output signal from said bridge circuit means to said electrically-controlled motor device to cause said electrode to move downwardly toward said molten pool.

9. In a consumable electrode furnace of the type in which an arc is struck between a consumable electrode and a molten pool of metal beneath it and in which an electrically-controlled motor device is employed to move the electrode downwardly toward the molten pool as it is consumed; the improvement comprising bridge circuit means including first and second potentiometer devices each having a movable tap thereon and arranged such that movement of the one tap without corresponding movement of the other will unbalance the bridge circuit means to produce an output signal, means operatively connecting the movable tap on one of said potentiometer devices to said electrode whereby that tap will be caused to move in an amount proportional to movement of the electrode downwardly toward said molten pool, servomotor means connected to the tap on the other of said potentiometer devices, means for detecting positive-going fluctuations in the voltage across said arc which recur at a frequency beneath about 30 cycles per second, means for producing an electrical signal which varies in response to variations in said positive-going voltage fluctuations, circuit means for applying said electrical signal to the servomotor means whereby the tap on the other potentiometer device will be caused to move continuously in a direction to counteract unbalance of the bridge circuit means caused by movement of the tap on said one potentiometer device, and means for applying an output signal from said bridge circuit means to said electrically-controlled motor device to cause said electrode to move downwardly toward said molten pool.

References Cited by the Examiner

UNITED STATES PATENTS

| | | | |
|---|---|---|---|
| 2,877,281 | 3/59 | Eaton | 13—13 |
| 3,022,441 | 2/62 | Muller et al. | 314—69 |
| 3,097,252 | 7/63 | Robinson | 13—13 |

RICHARD M. WOOD, *Primary Examiner.*

JOSEPH V. TRUHE, *Examiner.*